United States Patent
Wiederkehr

[11] Patent Number: 6,056,275
[45] Date of Patent: May 2, 2000

[54] DEVICE FOR INTRODUCING GAS INTO LIQUIDS

[75] Inventor: Hans Wiederkehr, Lindau/ZH, Switzerland

[73] Assignee: Hans Wiederkehr and Kurt Wiederkehr, Zurich, Switzerland

[21] Appl. No.: 09/070,601

[22] Filed: Apr. 30, 1998

[51] Int. Cl.$^7$ .................................. B01F 3/04
[52] U.S. Cl. ............. 261/4; 261/78.2; 210/198.1; 210/257.1; 210/266; 210/282
[58] Field of Search .................. 261/4, 6, 78.2; 210/198.1, 205, 220, 257.1, 266, 282

[56] References Cited

U.S. PATENT DOCUMENTS

| | | | |
|---|---|---|---|
| 3,904,393 | 9/1975 | Morse | 261/4 |
| 4,642,192 | 2/1987 | Heskett | 210/763 |
| 4,724,104 | 2/1988 | Kim | 261/6 |
| 4,894,149 | 1/1990 | Block | 210/220 |
| 5,100,543 | 3/1992 | Stauffer et al. | 210/220 |
| 5,149,437 | 9/1992 | Wilkinson et al. | 210/282 |
| 5,221,473 | 6/1993 | Burrows | 210/282 |
| 5,269,919 | 12/1993 | Von Medlin | 210/266 |
| 5,407,604 | 4/1995 | Luffman | 261/4 |

FOREIGN PATENT DOCUMENTS

WO9505415  2/1998  WIPO .

*Primary Examiner*—C. Scott Bushey
*Attorney, Agent, or Firm*—Bachman & LaPointe, P.C.

[57] ABSTRACT

In a device for introducing gases into liquids, in particular water, at least one prefilter being incorporated into the liquid feed, followed by an atomization device with a connection to a gas supply, and at least one further postfilter being incorporated between the atomization device and a storage container, the filters, the atomization device and the storage container are combined in a modular design to form a compact installation.

7 Claims, 1 Drawing Sheet

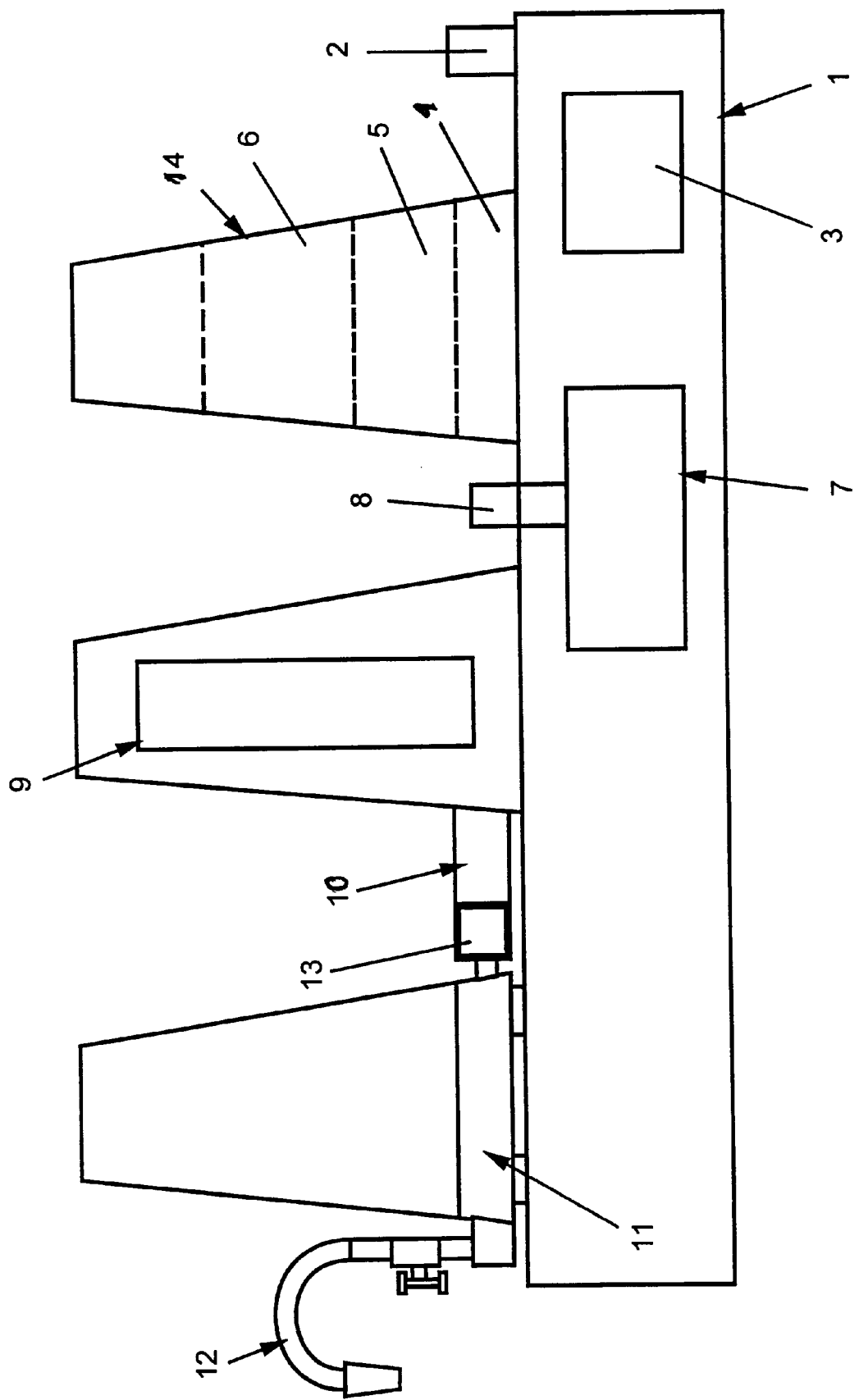

DEVICE FOR INTRODUCING GAS INTO LIQUIDS

BACKGROUND OF THE INVENTION

The invention relates to a device for introducing gases into liquids, in particular water, at least one prefilter being incorporated into the liquid feed, followed by an atomization device with a connection to a gas supply, and at least one further postfilter being incorporated between the nozzle device and a storage container.

Drinking water is the most important foodstuff for sustaining life. However, under current conditions, drinking water is also a manufactured foodstuff. Environmental pollutants from industry and traffic, plant protection agents, over-fertilization and so on are increasingly contaminating groundwater and surface water. Throughout the world, waterworks are often only able to observe the legally prescribed drinking water regulations and the fixed limits, in particular with regard to the contents of pollutants such as nitrates, chlorine and arsenic by employing considerable effort and resources.

Another element which is important for the survival of human beings is oxygen. It is known, for example, to carry out a therapy using oxygen, in which high levels of oxygen are supplied to the body via the lungs.

Furthermore, PCT/IB97/00930 also discloses a process in which water is enriched with oxygen, and this drink is used for therapeutic purposes on people and animals.

It is the principle object of the present invention to provide a device and process for filtering and oxygenating water which operates efficiently and is simple to handle.

SUMMARY OF THE INVENTION

The foregoing object is achieved by the invention wherein the filters, the atomization device and the storage container are combined in a modular design to form a compact installation.

This arrangement results in a device which can be employed not only in an industrial context but also as a domestic appliance for families and patients, in particular after stays at a health resort or therapies.

A significant feature of an improved embodiment of the present invention is that the storage container and/or the filter(s) is/are releasably connected to a support device. If this applies, for example, to the storage container, then the latter can be removed from the support device, after having been filled with oxygen-enriched water, and can be placed on a dining table, office desk or the like. Meanwhile, a further storage container can already be connected to the support device and filled.

However, the releasability also applies to the filters, since these should be cleaned and/or exchanged from time to time.

The technical form taken by the releasability function will be of secondary importance. There are numerous commercially available possibilities for accomplishing this. The important factor is that when the storage container or the filter is released, the line is closed at the same time, so that water or oxygen-enriched water does not leak out of an open line in an undesired manner. Here too, there are a large number of known nonreturn valves or the like.

A pump unit, via which the water is pumped through the filters, may also be assigned to the support device or to the connection to a water main system. The pump unit ensures that the pressure of the water in the line is increased to a desired operating pressure, and it is also possible for flowback to be prevented and for pressure to be compensated in the pump unit.

In a preferred exemplary embodiment of the invention, the prefilter is a multistage filter. A first layer of this filter preferably comprises cellulose and serves to separate out coarse particles, such as for example sand, rust or the like. This is followed by a second layer of metallic composition, which mainly comprises copper and/or zinc and other metals and which, when water flows through, brings about electrophoresis, an electrokinetic phenomenon, namely the migration of charged particles which are dissolved in liquid, with the result that there is a reduction of chlorins in an oxidation-reduction reaction and also sterilization takes place.

This second layer is preferably followed by a third layer of sintered granular activated carbon, in which in particular taste- and odor-bearing substances are adsorbed on flowing through each activated carbon particle in the entire level. The activated carbon granules, with their macropores and mesopores and a size of at most 0.1 mm, have an internal surface area of up to 14,000 $m^2$ per gram. In a filter with a diameter of 80 mm and approximately 460 g of activated carbon granules, a liquid volume of one liter of water is flushed and filtered, in a completely chaotic path, over a chemically pure surface of 680,000 $m^2$ within one minute at a pressure of 4 bar. A suitable material is manufactured by Ernst Schweizer AG of Lindau, Switzerland and sold under the name FILTERBLOC.

The postfilter, by contrast, will essentially be a carbomonoblock filter. Every relatively large dirt particle or microbe will inevitably be deposited upstream of this filter block, since they are unable to penetrate its pores. If a microbe should nevertheless penetrate into the inner labyrinth, it will be deposited in the inner labyrinth, thus ruling out any rearrangement or return to the filtrate. The compensation of adsorption isotherms takes place inevitably and is not linked to time and flow rate. This filter serves exclusively for the sterilization of the water.

The value of the above filters lies in the characteristic, physicochemical property and/or in the fact that a specific adsorption and ion exchange takes place in a straightforward manner without the use of chemical agents.

It is also conceivable to use special filters, specifically membranes made of porous glass. These membranes have the advantage that their molecular sieve can be adjusted. Porous glass can be processed to form capillary membranes of adjustable pore size. It has proven particularly effective where corrosive media are used or where an inert reaction vessel is required. The pores can be made to measure and can be set to an accuracy of 1 nm within a range from 10 to 100 mm.

Another essential element of the present device is the atomization device. In the atomization device, oxygen is mixed with the water. The oxygen atoms hold 6 electrons in the outer electron shell, which can easily be built up to form a noble gas shell (8-electron shell) by taking up two further electrons. As a result, the oxygen atom has two negative charges (single electrons, unpaired electrons).

Since oxygen has a higher atomic number than hydrogen, the former attracts the latter's electrons, leading to an asymmetric distribution of the positive and negative charges in the water molecule. Van der Waals forces lead to the formation of hydrogen bonds and crystalline lattices. This results in water clusters, like a type of molecular network, which can trap gas atoms and hold them between the meshes. In this process, so-called ionic bonds are formed, specifically between the water and oxygen molecules. As described, oxygen molecules lie in the gaps between the water molecules and are covered over by the network, in the manner of a kind of water membrane.

The maximum oxygen concentration is dependent on the flow set and is established only after approximately 5 minutes. The desired flow can be selected in a stepless manner using a fixed pressure reducer and integrated helices and different nozzle sizes, so that no measurements or subsequent adjustments are required. In practice, it has been found that suitable atomization allows an uptake of 70 to 90 mg per liter of water to be achieved.

A number of devices are available for atomization. For example, a membrane system can be used. A further possibility is a venturi tube with following nozzle. Also possible are a pressure microchamber, ultrasonic atomization or molecular sieve atomization.

Overall, the installation according to the invention operates very economically and is easy to handle.

Water is not the only suitable liquid, but rather in particular any liquid may be considered. A gas other than oxygen may be introduced into the liquid as the gas serving for specific purposes. Consideration may be given, for example, to helium or laughing gas, etc.

BRIEF DESCRIPTION OF THE DRAWINGS

Further advantages, features and details of the invention will emerge from the following description of preferred exemplary embodiments and with reference to the drawing, the single Figure of which shows a diagrammatic depiction of a device according to the invention for introducing oxygen and other gases into liquids.

DETAILED DESCRIPTION

According to the invention, this device is designed as a compact installation, the individual elements being provided on or in a support device 1.

A water connection to a normal water main or some other link is denoted by 2. The water or liquid passes to a pump unit 3, which pumps the water through a prefilter 14. According to the invention, this prefilter 14 is chosen to be a so-called multistage filter, which comprises a first layer 4 of cellulose material for separation of coarse particles and a second layer 5 of a material of metallic composition which causes an oxidation-reduction reaction in the water, which leads to a reduction of the chlorins in the water.

The second layer 5 is followed by a third layer 6, in which granular activated carbon is situated.

From the prefilter 14, the water passes to an atomization device 7. In the atomization device 7, oxygen is mixed with the water through a connection 8, resulting in a close attachment between the oxygen molecules and the water molecules.

From the atomization device 7, the water/oxygen mixture passes into a postfilter 9, which in this case is preferably a carbo-monoblock filter, which ensures sterilization. The carbo-monoblock filter is made of a sintered activated carbon granulate material forming an internal labyrinth.

This postfilter 9 is followed by a postatomization stage 10 via a nozzle or membranes, which postatomization stage is in turn connected to a storage container 11, which for its part is followed by a water tap 12.

It is diagrammatically indicated that the storage container 11 is releasably connected to the support device 1 and the postatomization stage 10, a quick-acting coupling 13 being shown only diagrammatically.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A device for introducing gases into liquids comprises a liquid inlet and a liquid outlet, a liquid prefilter downstream of said liquid inlet, an atomization unit downstream of said liquid prefilter, gas inlet means associated with said atomization unit for introducing a gas into said liquid to form a gas enriched liquid, a postfilter downstream of said atomization unit for receiving said gas enriched liquid, and a storage container downstream of said postfilter wherein a postatomization stage is provided between said postfilter and said storage container.

2. A device according to claim 1 wherein said prefilter, said atomization unit, said postfilter and said storage container are combined in a modular design to form a compact installation.

3. A device according to claim 1 wherein the storage container the prefilter and the postfilter are removable.

4. A device according to claim 3 including a pump unit.

5. A device according to claim 1 wherein the prefilter is a multistage filter comprising a first stage for removing coarse particles, a second stage for reducing chlorine content and for sterilization, and a third stage for removing taste and odor.

6. A device according to claim 5 wherein said first stage includes a cellulose filter, said second stage includes a metallic filter and said third stage includes a sintered activated carbon filter.

7. A device according to claim 1 wherein said postfilter includes a carbo-monoblock filter.

* * * * *